US008640387B2

(12) United States Patent
Harrison et al.

(10) Patent No.: US 8,640,387 B2
(45) Date of Patent: Feb. 4, 2014

(54) SPORTS PITCH RAINWATER HARVESTING SYSTEMS SUITABLE FOR USE IN DEVELOPING COUNTRIES

(75) Inventors: Jane Harrison, Princeton, NJ (US); David Turnbull, Princeton, NJ (US)

(73) Assignee: ATOPIA Research, Princeton, NJ (US)

( * ) Notice: Subject to any disclaimer, the term of this patent is extended or adjusted under 35 U.S.C. 154(b) by 0 days.

(21) Appl. No.: 13/177,150

(22) Filed: Jul. 6, 2011

(65) Prior Publication Data

US 2012/0006412 A1    Jan. 12, 2012

Related U.S. Application Data

(60) Provisional application No. 61/362,216, filed on Jul. 7, 2010.

(51) Int. Cl.
*E04H 3/12*   (2006.01)
*F15D 1/00*   (2006.01)
*E01C 13/08*  (2006.01)

(52) U.S. Cl.
USPC ......... 52/6; 52/8; 52/DIG. 9; 137/1; 137/544; 210/257.1; 210/747.2; 210/747.3

(58) Field of Classification Search
USPC .................. 52/6, 8, 192, DIG. 9; 137/1, 544; 210/257.1, 747.1, 747.2, 747.3
See application file for complete search history.

(56) References Cited

U.S. PATENT DOCUMENTS

| | | | | |
|---|---|---|---|---|
| 316,184 A | * | 4/1885 | Sancan | 137/122 |
| 3,795,180 A | * | 3/1974 | Larsen | 405/36 |
| 3,908,385 A | * | 9/1975 | Daniel et al. | 405/37 |
| 4,023,506 A | * | 5/1977 | Robey | 47/58.1 R |
| 4,032,439 A | | 6/1977 | Oldham | |
| 4,044,179 A | * | 8/1977 | Haas, Jr. | 428/17 |
| 4,689,145 A | * | 8/1987 | Mathews et al. | 210/170.03 |
| 4,880,333 A | * | 11/1989 | Glasser et al. | 405/43 |
| 4,913,596 A | * | 4/1990 | Lambert, III | 405/43 |

(Continued)

FOREIGN PATENT DOCUMENTS

| | | | |
|---|---|---|---|
| EP | 692573 A1 | * | 1/1996 |
| FR | 2850985 A1 | * | 8/2004 |

(Continued)

OTHER PUBLICATIONS

Thesier, Kelly. "Target Field water recycling unique: Pentair system should reduce needs by 50 percent". MLB.com, Jan. 12, 2010 [online]. [Retrieved on Nov. 16, 2011]. Retrieved from the Internet: <URL: http://minnesota.twins.mlb.com/news/article.jsp?ymd=20100112&content_id=7905456&vkey=news_min&c_id=min>.*

(Continued)

*Primary Examiner* — Basil Katcheves
*Assistant Examiner* — Rodney Mintz
(74) *Attorney, Agent, or Firm* — Crowell & Moring LLP

(57) ABSTRACT

A water harvesting sports arena system includes a stadium seating area, a playing surface operating as at least a part of a water catchment arrangement, and a water reservoir, which may be a segmented tank, positioned below the playing surface to receive and store water passing through the playing surface. A water discharge arrangement is associated with the water reservoir so that water is dischargeable from the water reservoir for consumption or other uses. The stadium seating area is advantageously impervious to water so as to direct water toward the playing field for capture.

12 Claims, 4 Drawing Sheets

(56) References Cited

U.S. PATENT DOCUMENTS

| | | | |
|---|---|---|---|
| 5,064,308 A | 11/1991 | Almond et al. | |
| 5,120,158 A * | 6/1992 | Husu | 405/43 |
| 5,234,286 A * | 8/1993 | Wagner | 405/53 |
| 5,250,340 A * | 10/1993 | Bohnhoff | 428/99 |
| 5,306,317 A * | 4/1994 | Yoshizaki | 47/1.01 R |
| 5,507,595 A * | 4/1996 | Benson | 405/43 |
| 5,597,479 A * | 1/1997 | Johnson | 210/192 |
| 5,788,407 A * | 8/1998 | Hwang | 404/81 |
| 5,810,510 A * | 9/1998 | Urriola | 405/45 |
| 5,848,856 A | 12/1998 | Bohnhoff | |
| 6,095,718 A * | 8/2000 | Bohnhoff | 405/52 |
| 6,132,138 A * | 10/2000 | Haese | 405/37 |
| 6,398,455 B1 | 6/2002 | Volstad | |
| 6,436,283 B1 | 8/2002 | Duke | |
| 6,818,127 B1 * | 11/2004 | Ketrow | 210/170.03 |
| 6,821,445 B2 * | 11/2004 | Miyata et al. | 210/793 |
| 6,936,176 B1 * | 8/2005 | Greene, III et al. | 210/702 |
| 6,979,148 B2 * | 12/2005 | Happel et al. | 405/43 |
| 7,025,076 B2 * | 4/2006 | Zimmerman et al. | 137/1 |
| 7,025,887 B1 | 4/2006 | Kirts et al. | |
| 7,147,401 B2 * | 12/2006 | Wickens | 405/45 |
| 7,198,432 B2 * | 4/2007 | Chen | 405/50 |
| 7,413,380 B2 * | 8/2008 | Corwon et al. | 405/37 |
| 7,491,330 B2 | 2/2009 | Harvey | |
| 7,527,738 B2 * | 5/2009 | Gonzalez et al. | 210/690 |
| 7,553,418 B2 * | 6/2009 | Khudenko et al. | 210/601 |
| 7,591,610 B2 * | 9/2009 | Krichten et al. | 405/50 |
| 7,661,904 B2 * | 2/2010 | Maggiacomo | 405/43 |
| 7,971,602 B2 * | 7/2011 | Lewis | 137/357 |
| 8,025,456 B2 * | 9/2011 | Kaul | 404/27 |
| 8,137,024 B2 * | 3/2012 | Kaul | 404/31 |
| 8,142,101 B2 * | 3/2012 | Kaul | 404/31 |
| 8,221,029 B2 * | 7/2012 | Henry et al. | 405/36 |
| 8,297,006 B2 * | 10/2012 | Watson | 52/169.7 |
| 8,496,810 B2 * | 7/2013 | Forrest | 210/162 |
| 2001/0030161 A1 | 10/2001 | Hosoya | |
| 2003/0085176 A1 * | 5/2003 | Gomes De Oliveira et al. | 210/703 |
| 2003/0114343 A1 * | 6/2003 | Wolf | 510/395 |
| 2005/0047866 A1 * | 3/2005 | Chen | 404/75 |
| 2005/0069386 A1 * | 3/2005 | Happel et al. | 405/40 |
| 2005/0109707 A1 * | 5/2005 | Bryant | 210/747 |
| 2007/0237583 A1 * | 10/2007 | Corwon et al. | 405/37 |
| 2008/0073263 A1 | 3/2008 | Yamaguchi | |
| 2008/0098652 A1 * | 5/2008 | Weinbel | 47/1.1 F |
| 2008/0169258 A1 | 7/2008 | Weisbauer | |
| 2008/0272064 A1 | 11/2008 | Leonard | |
| 2008/0292865 A1 * | 11/2008 | Ball et al. | 428/317.1 |
| 2009/0000226 A1 * | 1/2009 | Woods et al. | 52/220.3 |
| 2009/0045135 A1 * | 2/2009 | Khudenko et al. | 210/631 |
| 2009/0067924 A1 * | 3/2009 | Kaul | 404/17 |
| 2009/0128085 A1 | 5/2009 | Yang | |
| 2009/0133754 A1 * | 5/2009 | Appel | 137/1 |
| 2009/0272696 A1 * | 11/2009 | Simon et al. | 210/747 |
| 2009/0282754 A1 * | 11/2009 | Watson | 52/169.6 |
| 2010/0093454 A1 * | 4/2010 | Ball et al. | 472/92 |
| 2010/0133201 A1 * | 6/2010 | Wacome | 210/747 |
| 2010/0263295 A1 * | 10/2010 | Flanagan | 52/1 |
| 2010/0294705 A1 * | 11/2010 | Henry et al. | 210/170.07 |
| 2010/0300544 A1 * | 12/2010 | Baldwin et al. | 137/1 |
| 2011/0017678 A1 * | 1/2011 | Anderson et al. | 210/747 |
| 2011/0023967 A1 * | 2/2011 | Honda | 137/1 |
| 2011/0214364 A1 * | 9/2011 | Fuller | 52/173.3 |
| 2012/0006738 A1 * | 1/2012 | Harrison et al. | 210/257.1 |
| 2012/0007365 A1 * | 1/2012 | Harrison et al. | 290/55 |
| 2012/0266961 A1 * | 10/2012 | Holmes | 137/1 |
| 2012/0284210 A1 * | 11/2012 | Szydlowski et al. | 705/500 |
| 2013/0025686 A1 * | 1/2013 | Norton | 137/1 |
| 2013/0087509 A1 * | 4/2013 | Davis et al. | 210/747.3 |
| 2013/0104994 A1 * | 5/2013 | Bettiol et al. | 137/1 |

FOREIGN PATENT DOCUMENTS

| | | | |
|---|---|---|---|
| WO | WO 2005/100786 A1 | | 10/2005 |
| WO | WO 2007009340 A1 * | | 1/2007 |
| WO | WO 2010/037005 A2 | | 4/2010 |
| WO | WO 2010090554 A2 * | | 8/2010 |

OTHER PUBLICATIONS

International Preliminary Report on Patentability for PCT/US2011/043162 dated Jan. 8, 2013 (5 pages).*

International Preliminary Report on Patentability for PCT/US2011/043164 dated Jan. 8, 2013 (5 pages).*

Princeton, "Wind Energy and Rainwater Harvesting Technologies for Post-Disaster Relief and Recovery", Princeton University, Apr. 2010, pp. 9-11, published at http://commons.princeton.edu/kellercenter/docs/Wind-Energy-Haiti-Project-2010.pdf.

Hilary Parker, "Researchers Develop Relief Technologies for Haiti", Princeton University Bulletin, May 24, 2010, p. 8, vol. 99, No. 14, published at http://www.princeton.edu/main/news/bulletin/docs/Bulletin-2010-05-24.pdf.

Pitch_Africa: a project by ATOPIA Research, Sep. 2008, ATOPIA_RESEARCH Inc., Princeton, New Jersey. (Three (3) pages).

PITCH_AFRICA Log 2.1, Cistern_X, Jan.-Jun. 2009, ATOPIA_RESEARCH Inc., Princeton, New Jersey. (Four (4) pages).

"Catch the Rain so it Falls Forever", PITCH_AFRICA LOG 2.2, Cisterns That Do Other Things, Jan.-Jun. 2009, ATOPIA_RESEARCH Inc., Princeton, New Jersey. (Six (6) pages).

PITCH_AFRICA Log 2.3, Street Soccer Venue, Jan.-Jun. 2009, ATOPIA_RESEARCH Inc., Princeton, New Jersey. (Seven (7) pages).

Pitch_USA Log 1: a project by ATOPIA Research, Introduction, Oct. 2009, ATOPIA_RESEARCH Inc., Princeton, New Jersey. (Five (5) pages).

* cited by examiner

SPORTS PITCH RAINWATER HARVESTING SYSTEMS SUITABLE FOR USE IN DEVELOPING COUNTRIES

This application claims priority under 35 U.S.C. §119(e) to U.S. provisional application Ser. No. 61/362,216, filed Jul. 7, 2010, the entire disclosure of which is incorporated by this reference into the present application.

BACKGROUND OF THE INVENTION

1. Field of the Invention

The present invention generally relates to water harvesting systems of different scales and their use in creating a community using sport as a catalyst and based on the ability to provide access to water.

2. Description of Related Art

Various documents presently exist that describe arrangements relating to rainwater collection. The ATOPIA RESEARCH Inc. document titled Pitch Africa: A Project by ATOPIA Research (September 2008), for example, discloses a network of artificial watersheds and aquifers and mentions the use of four different scales of rainwater capturing devices, including a small single container cistern, a larger two container cistern, a matrix of containers under a street soccer tournament venue, and a full rainwater harvesting soccer field.

The ATOPIA RESEARCH Inc. document titled PITCH_AFRICA LOG 2.1, CISTERN_X (January-June 2009) describes a single twenty foot long shipping container, a lightweight hinged frame to form a rainwater harvesting hood, and a textile envelope.

The ATOPIA RESEARCH Inc. document titled PITCH_AFRICA LOG 2.2, CISTERNS THAT DO OTHER THINGS (January-June 2009) describes two twenty foot long shipping containers that combine to store a minimum of 60,000 liters (15,850 gallons) of water annually.

The ATOPIA RESEARCH Inc. document titled PITCH_AFRICA LOG 2.3, STREET SOCCER VENUE (January-June 2009) describes an arrangement for using the single container cistern (Log 2.1), the two-container cistern (Log 2.2), and a matrix of containers under a street soccer tournament venue and a full size soccer field.

The ATOPIA RESEARCH Inc. document titled PITCH_AFRICA LOG 3, 3.2 SPECIAL CONTAINERS (April-June) describes various types of specially fitted out shipping containers that make possible the provision of services in areas without basic amenities.

The ATOPIA RESEARCH Inc. document titled PITCH_AFRICA LOG 3, 3.2 FURNITURE (April-June) describes a modular system of tables and stools using components with certain geometric configurations.

Water collection is a worldwide problem. According to the World Health Organization, 1.1 billion people in the world lack proper drinking water, and 5 million people, 2 million of whom are children, die from drinking unsafe water each year. The World Health Organization further estimates that 80% of all sickness in the world is due to unsafe water and poor hygiene, and that 4000 children die every day due to drinking unsafe water. It is estimated that by 2025, 48 countries will be facing water shortages. At least 22 of those countries are in sub-Saharan Africa. By 2050, water scarcity will affect at least 2 billion people; in the worst-case scenario, water scarcity will affect 7 billion people in 60 countries.

In Africa, more than 420 million people do not have access to clean water and are without an improved water supply. In rural Africa, women often walk ten miles or more every day to fetch water. In the dry season, it is not uncommon for women to walk twice this distance, only to arrive at a water source that is a dirty and polluted health hazard. Women often have to wait in turn to collect water, as well as travelling such long distances. Such waiting times can add five hours to the journey. Many traditional water sources dry out for several months each year, and it can take up to an hour for one woman to fill her bucket. To avoid such long waits, many women get up in the middle of the night to get to the water source when there is no queue. This adds to the dangers of the journey, which can frequently result in accidents. It is not uncommon for women and children to be spending 8 hours a day in the process of collecting water. The UNEP (United Nations Environment Programme) estimates that 40 billion working hours are lost each year in Africa carrying water, causing "water poverty," which affects mostly women and children, who are unable to go to school as they often help their mothers collect water or work at home, in place of their mothers, while their mothers travel to collect water. For hundreds of millions of the rural poor in Africa, agriculture is the key to both their escape from poverty and their development. Without water, agricultural development in much of sub-Saharan Africa is severely constrained. People in the developing world need to have access to good quality water in sufficient quantity, water purification technology, and availability and distribution systems for water.

In the 1980s, declared "The International Decade of Water" by the UN, an assumption was made that groundwater was an inherently safer water source for communities than surface water (rivers, ponds, canals, and so on), and that this shift in focus would reduce problems such as cholera. Surface water is especially susceptible to problems of pollution and evaporation, making the extraction of groundwater, which is relatively protected from bacteriological contamination and evaporative loss, coupled with the relative ease of tapping into a water supply at the point of need, very attractive. As a result, people have come to rely increasingly on the digging of wells and the drilling of boreholes as the mainstay of water development and the most popular way of supplying water to people in small communities. It is increasingly understood, however, that boreholes can be extremely problematic.

Borehole drying is a worldwide issue that needs serious attention. It has been reported that about 250,000 boreholes have been constructed for use in Africa, and that, according to the World Health Organization, it is estimated that 60% of these boreholes are broken or have run dry. In Mali, it is estimated that 90% of the boreholes cease to function within a year after construction. As reported in Mali, lack of confidence on the sustainability of boreholes has made women prefer surface water. Similar reports have been received from South Africa, Uganda, Nigeria, and many other African countries. While groundwater supplies have reduced problems with bacteriological contamination, they can have serious problems with toxicity caused by salinity or high levels of fluoride. Individuals in communities that continue to choose to drink surface water as a matter of preference frequently dislike the taste of borehole water.

In many instances, boreholes are drilled into aquifers containing water millions of years old that cannot be replenished. Once depleted, these water resources are gone. In general, pumping in excess of any aquifers recharge rates results in the lowering of groundwater levels. In coastal areas, excessive pumping can also cause the intrusion of saline water. Improper borehole construction can result in the borehole blocking water transmission from the aquifer. Problems with clogging of filter media and the slots of the screen pipes are also widespread. The persistent failures of community-based maintenance programs are also a significant factor in borehole failure. Boreholes are usually community owned, and are typically handed over to the community by the government or NGO after a drilling project is complete. It is usual practice to train local personnel to maintain, manage, and repair the boreholes. However, population densities in rural areas are relatively low, which means that there are seldom enough boreholes in a region to provide sufficient work for a trained mechanic. Additionally most communities lack the technology and funds to carry out such technical work.

SUMMARY OF THE INVENTION

It is contemplated, according to the invention, to utilize rain as a resource. The volume of water falling on the African continent each year is estimated to be 13 times the amount needed to sustain its entire population of 1 billion people. It is estimated that the rainwater harvesting potential in Ethiopia is 7.5 times that of annually renewable ground water supplies. A similar estimate for Tanzania is 11 times that of annually renewable ground water supplies, while in Kenya, the same estimate is 20 times that of annually renewable ground water supplies. The quantities of rain that fall within the relatively short rainy season are great, but without widespread mechanisms for harvesting and storing water, much evaporates. At the Pan-African Conference on Water in Addis Ababa, 2003, and at the African Millennium Development Goals (MDGs) on Hunger meeting in 2004, rainwater harvesting was identified as among the important interventions necessary towards meeting the MDGs in Africa.

Rainwater harvesting is the deliberate collection of rainwater from a surface known as a catchment, and storage of collected rainwater in physical structures or within the soil profile. Rainwater may be harvested from roofs, ground surfaces, and from ephemeral watercourses, can provide affordable water for household and institutional use, agriculture, and environmental flows, and contributes to the prevention of flood damage. Assuming a per capita rural water consumption of 20 liters/day (5.3 gallons/day), which is equivalent to an annual water demand of 7.3 cubic meters (1928 gallons) per person per year, adequate water in a region with only 200 mm (7.9 inches) of rainfall per annum could be supplied by a roof catchment of 36.5 square meters (43.7 square yards). All that is required to provide such a roof catchment is the presence of roofs to provide the necessary catchment area. For years, NGOs and faith-based groups and networks have advocated the use of rainwater harvesting. Progress has been slow, however, given the institutionalized preoccupations with groundwater resources.

Poverty is inextricably linked to insufficient water resources; the provision of water is fundamental to achievement of all Millennium Development Goals, not just to those goals that explicitly refer to water. A lack of water has a key impact on many livelihood activities and has a significant impact on the health and productivity of the ecosystems on which poor people depend. Adequate and reliable water supplies for agricultural activities is key to poverty reduction throughout the developing world, and the design of community and domestic water schemes that make water available for home-based livelihood activities, such as vegetable production, pottery, or laundering, is effective in targeting the poor and supporting diversified livelihoods. Providing access to safe and sufficient potable water, free of water borne disease, is the most effective way to improve health.

Historically, sport was largely underestimated as a major tool in humanitarian programs, and has been rarely used in a systematic way. Today, however, an increasing number of national and international development organizations are using sport to add to their approaches in local, regional and global development and peace promotion programs. This is done most of the time in close cooperation with sports organizations. More than any other sport, soccer (referred to also here as "football") has the power to unite people and cultures all over the world. As a team sport, soccer promotes fairness and tolerance, leapfrogs gender boundaries, and fosters mutual understanding, thereby contributing to the positive development of personality and character. Passion for the sport is ubiquitous, particularly in Africa. Sport provides motivation for young people and teaches strategies of peaceful debate, provides instruction in how to deal with defeat, and molds personalities. Sports-based youth programs have been used to address a variety of development issues, and the diversity of panelists highlighted represented the unique ability of sport, as a platform for development, to address a broad range of sectors including peace and conflict, gender inequality, health, education and economic development.

In one preferred form, a water harvesting sports arena system according to the invention includes a stadium seating area, a playing surface operating as at least a part of a water catchment arrangement, and a water reservoir, which may be a segmented tank, positioned below the playing surface to receive and store water passing through the playing surface. A water discharge arrangement is associated with the water reservoir so that water is dischargeable from the water reservoir for consumption or other uses. Advantageously, the stadium seating area is impervious to water so as to direct water toward the playing field.

The playing surface includes multiple layers that exhibit respective coarse filtering, fine filtering, and support features, and the water discharge arrangement includes a water filtering system. Outlets can be arranged at locations along a perimeter of the water reservoir forming draw off points for unfiltered water can be arranged at locations along a perimeter of the water reservoir. The segmented tank constituting the water reservoir may be formed from shipping containers.

DETAILED DESCRIPTION OF THE INVENTION

Figure 1:
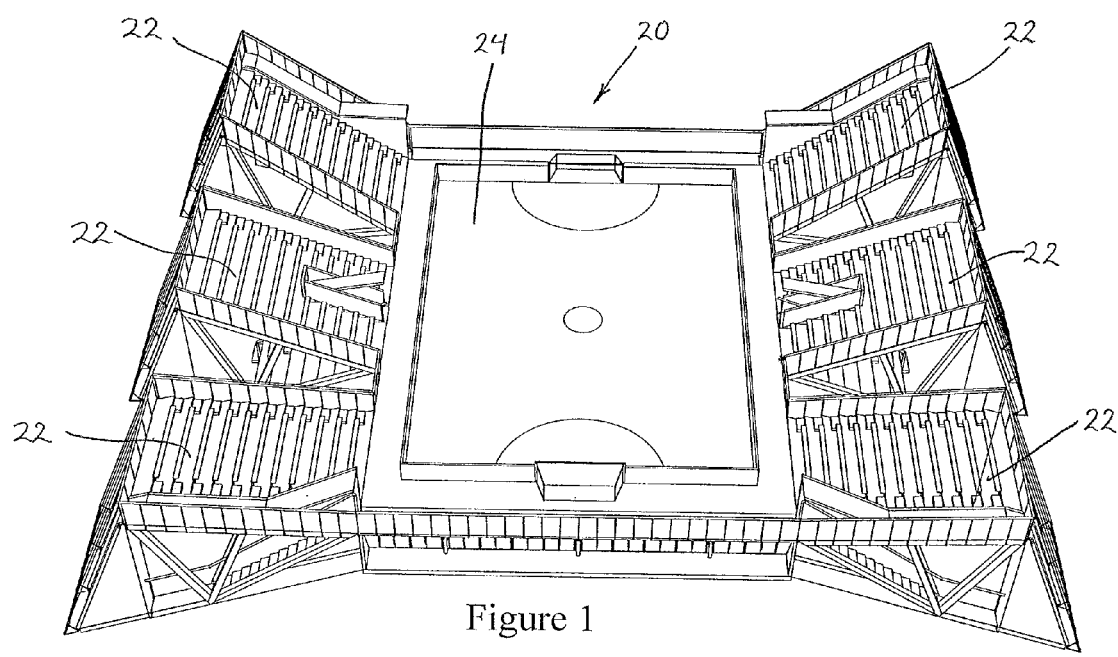
FIG. 1 is a view from above an overall water harvesting sports arena system according to one embodiment of the invention.

FIG. 1 illustrates an overall water harvesting system 20 that uses inclined ("raked") sports stadium seating areas 22 and the playing surface 24 itself as a rainwater catchment surface. The playing surface 24 is a 3 layer permeable membrane that filters out coarse particulate matter, including plant material, animal feces, and insects such as mosquitoes. Under the permeable playing surface 24, a reservoir 40, shown in FIG. 2 as configured as a segmented tank, holds the harvested water until it is needed. A modular ceramic water filtration bank 50 and solar pumps (not shown) adjacent to the reservoir and integrated into the stadium form are used to filter the stored water to achieve drinkable, safe and clean water at points of use.

The water harvesting system 20 provides a clean local water source, and serves as a school for the community, encouraging the sharing of knowledge about rainwater harvesting, water filtration, and sustainable agricultural practices, actively supporting maternal and community health and local efforts as a micro-enterprise. The water harvesting system 20, also referred to here as a "Sports Pitch Rainwater Harvesting System," can be tailored to support needs fundamental to each particular community.

Figure 2:
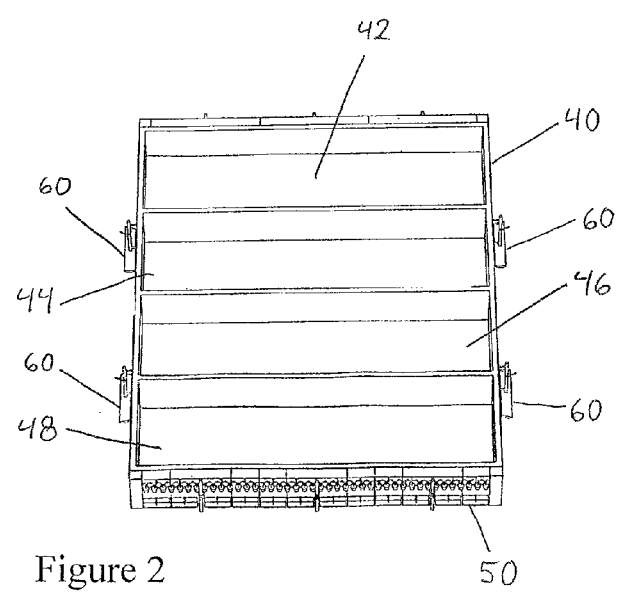
FIG. 2 illustrates a water-receiving reservoir located under the water permeable playing surface of the system shown in FIG. 1.

The water harvesting system illustrated in FIGS. 1 and 2 integrates community resources to address fundamental community needs in the areas of health, sport, water, and food. This particular system is centered on a street soccer venue. The overall structure is approximately 36.5 m (39.9 yards) in width and 45 m (49.2 yards) in length, surrounding a 22 m (24.1 yard) by 16 m (17.5 yard) soccer playing field. The seating areas 22 provide for seating of up to 1,000 people in the elevated stands. The structure captures rainwater as it falls onto the playing surface 24 and the surrounding seating areas 22. The water is directed through the playing surface, which acts as a pre-filter, into a modular water reservoir beneath the playing surface, where the water is stored until needed. As water is drawn off by way of the pumps (not shown) from the reservoir 40, it is filtered, using a simply constructed clay filtration system, for drinking, cooking, and washing, or directed into the surrounding fields to irrigate crops. When the water harvesting system 20 is configured as a street soccer venue as illustrated, in excess of 535 square meters (640 square yards) of community space underneath the seating areas 22, usable to house classrooms, workshops, meeting rooms, and even a local market are provided.

Figure 3:
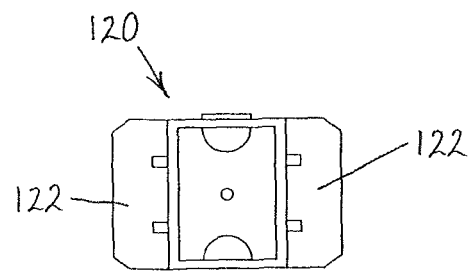
FIG. 3 is a schematic top plan view of a water harvesting system configured as a small street soccer venue.
Figure 4:
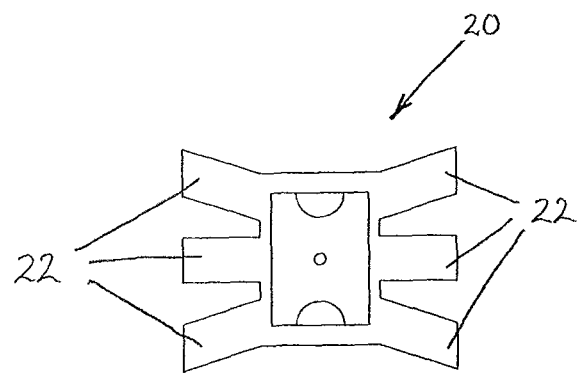
FIG. 4 is a schematic top plan view of a larger water harvesting system configured as a street soccer venue such as that illustrated in FIG. 1.
Figure 5:
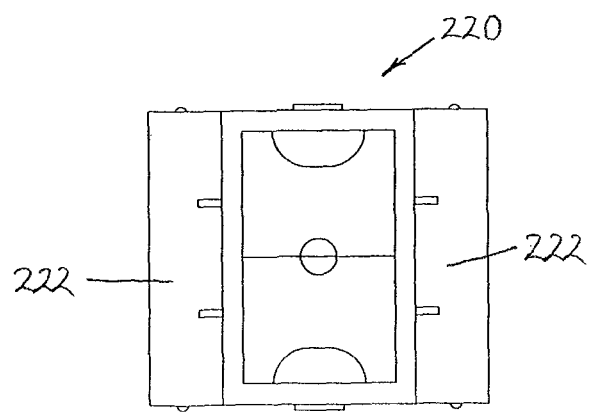
FIG. 5 is a schematic plan view of an even larger water harvesting system configured as a futsal stadium with bleacher seating in two continuous banks.

Versions of this structure have been developed to accommodate other court sizes and sports. Three such versions are illustrated by way of FIGS. 3-5. FIG. 3 illustrates a small street soccer venue 120, with bleacher seating in two continuous banks 122 holding 900-1000 people and providing a water catchment surface of approximately 919.8 square meters (9,901 square feet). FIG. 4 shows a larger street soccer venue 20 such as that mentioned in connection with FIGS. 1-2, with six separate seating areas 22 providing a water catchment surface of approximately 1,116 square meters (12,006 square feet), facilitating independent use of the enclosed areas under the bleacher seating as classrooms or community spaces that need to be separate. FIG. 5 illustrates a futsal stadium 220 with bleacher seating in two continuous banks 222 providing a water catchment surface of approximately 2,745 square meters (29,551 square feet).

Each of the structures mentioned is designed so that its actual size and features can be tailored to meet the specific needs of the communities it will serve. In addition, the particular designs allow the rainwater harvesting system to be built using only local materials that are readily available. The structures can be constructed using various systems and materials, including concrete, rammed earth, low-grade steel, or structural bamboo, depending on available resources and appropriateness to the community. The example illustrated has a steel structure, but the structural format is generic and can be adapted for other materials. The water reservoir can be constructed by adapting and lining abandoned ISO shipping containers, which can be readily found in parts of Africa, or, when such shipping containers are not available or cost prohibitive, using local masonry, concrete, or sheet materials. In any case, the reservoir may be lined with an impermeable fabric that is suitable for storing potable water.

The playing surface 24 is preferably a three layer surface such as that of the multi-layer water catchment arrangement described in commonly assigned, co-pending U.S. patent application Ser. No. 13/176,489, filed Jul. 5, 2011, titled CONTINUOUSLY SUPPLIED WATER FILTRATION BANKS. Using such a three-layer surface permits large-scale particulate matter to be filtered from the water by the playing surface as the water enters the water storage reservoir 40. While captured in the reservoir 40, referring again to the embodiment illustrated in FIG. 2, the water is moved slowly among reservoir segments 42, 44, 46, and 48 using a solar powered circulating pump or a plurality of such pumps. Rainy season rainfall, which is often short term and intense, can be stored for more than 6 months using such a system.

Prior to human consumption or other use, a ceramic water filtration (CWF) system is used to filter 99.0% bacteria and viruses from the water. Such CWF system is preferably the modular ceramic water filtration bank 50 mentioned above in connection with FIG. 2, can effectively filter pathogens, including *E. coli*, from surface water, dramatically reducing sickness and mortality rates, and is described in detail in commonly assigned, co-pending U.S. patent application Ser. No. 13/176,489 mentioned above.

In each of the arrangements 20, 120, and 220, the respective seating banks or areas 22, 122, and 222 are impervious to water and are arranged so that rain-paths form naturally along the edges of the bank or area surface and where access ways are constructed. The playing surface itself is porous, and, again, is constructed as a three-layer surface. The top layer preferably is a porous polypropylene tile as would be found in many outdoor or indoor sports centers. This tile is typically UV resistant, and gives good traction for sport use. The tile is also flexible, so that the players can fall comfortably without the possibility of injury, and water permeable, so that surface water will drain readily, keeping the top surface dry enough for typical sports use. Use of such a material as the first layer of the pre-filter surface serves to keep large objects, animals, vegetable matter, and small particles out of the reservoir. Such a first layer is easy to clean, and provides a permanent shade membrane over the reservoir to minimize UV related challenges to the quality of the stored water.

The second layer is preferably a fine netting suitable for protection from insect penetration, and to reduce the potential impact of animal droppings, or insects and insect larvae on the quality of the stored water. The third and lowest layer is structural, and is preferably a modular tile surface using structural fiberglass perforated tiles or similar tiles, such as those typically used on ships or industrial marine drilling rigs. These tiles and all supporting structure are non-corrosive and inert to minimize the potential impact of rust and other oxides on stored water quality.

Figure 6:
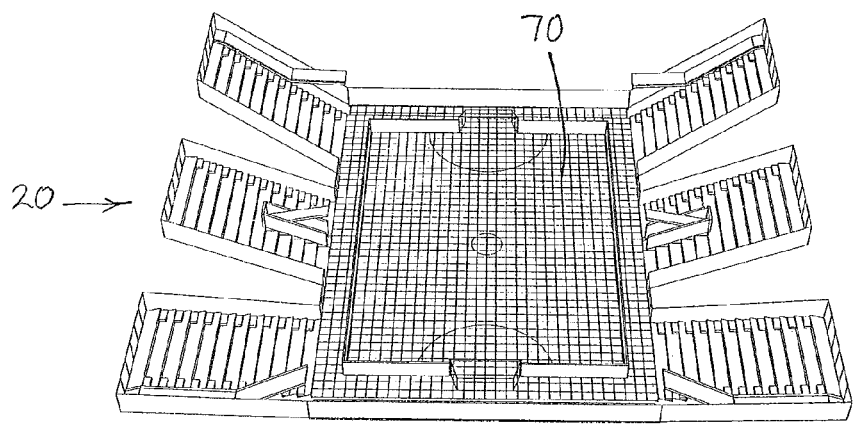
FIG. 6 is an exploded view of a system such as that shown in FIG. 1 illustrating playing surface component layers.
Figure 6:
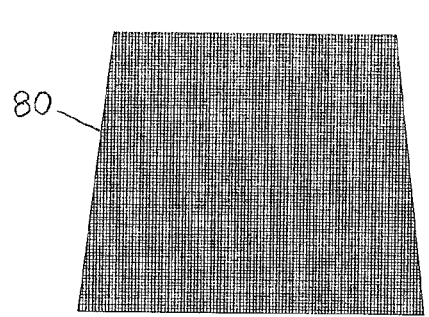
Figure 6:
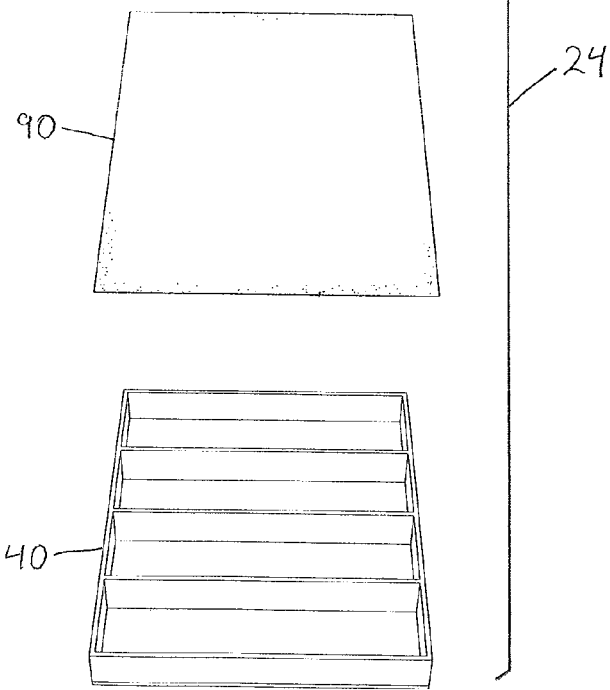

The exploded view provided by FIG. 6 illustrates an overall water harvesting system 20 with a playing surface 24 having a top layer 70, preferably of the 80% open porous polypropylene tile mentioned above, a second layer 80, preferably of the fine netting mentioned above, and a third and lowest layer 90, preferably formed of the structural fiberglass perforated tiles or similar tiles mentioned above disposed over the water storage reservoir 40.

Figure 7:
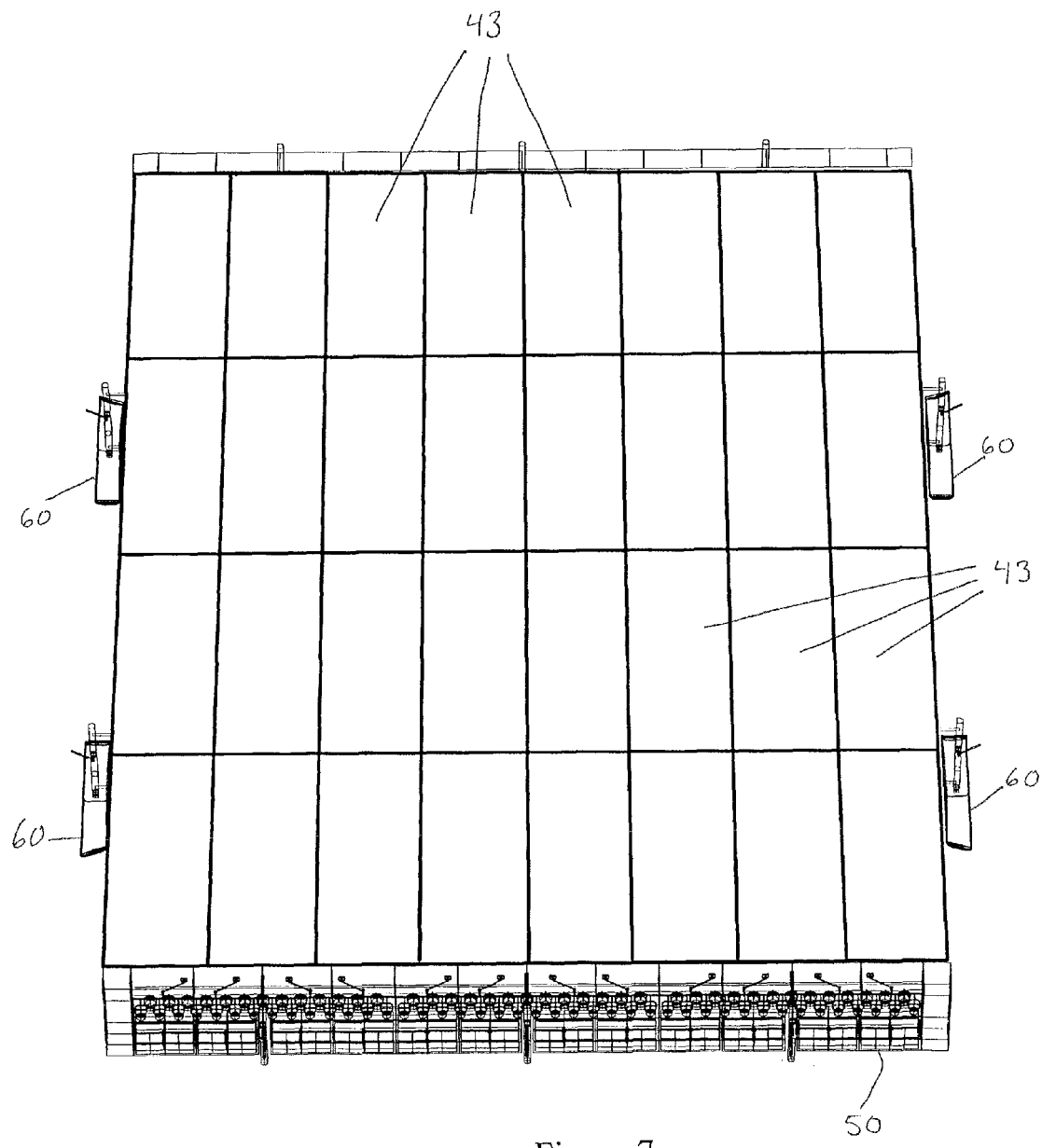
FIG. 7 shows a reservoir construction usable as an alternative to that illustrated in FIG. 2.

The reservoir can be made in many ways. As shown in FIG. 2, the reservoir 40 may be configured as a tank that is segmented to produce reservoir segments 42, 44, 46, and 48. The reservoir could alternatively be a segmented tank made, for example, from repurposed ISO (International Organization for Standardization) 6.1 meter (20') shipping containers 43 as shown in FIG. 7, which collectively form a segmented tank. In either instance, it is contemplated that the full reservoir volume will be sufficient for storing 1,000,000 liters (264,200 gallons) of water at any time, and that the segmented tanks that make up the reservoir will be interconnected at low levels. The tanks are lined with an impermeable membrane suitable for storing potable water. Individual tank lining membranes are connected to neighboring tank linings by short pipes that are sealed, such that they work as an integral part of the lining.

Appropriate connection glands or seals, pipe work, and valves are to be used to move water from segment to segment. Connection holes among the segmented tanks must be high enough so that sediment forming in any tank is below the connection holes but at a height appropriate to maintain the useful volume of water at a maximum. The tank connections also need to be designed so that individual tanks can be isolated and drained for repair.

Outlets can be arranged in any suitable location along the perimeter of the reservoir. In the arrangement illustrated, the outlets form draw off points for unfiltered water, for agricultural use, on the longitudinal edges. These outlets or draw-off points would be attached to irrigation pipe-work, including typical pipe connectors with a valve. The outlets are located at low levels to facilitate draw-off, if no pumps are used, but can be attached to pumps 60, such as hand pumps or solar powered pumps, if the ultimate point of use is at some distance from the reservoir. In the arrangement illustrated, there are also outlets arranged along the lateral edges of the reservoir. These outlets are connected to the modular ceramic water filtration bank 50 mentioned earlier and described in commonly assigned, co-pending U.S. patent application Ser. No. 13/176,489 mentioned above. Such a filtration bank incorporates pumps, header tanks, distribution piping, CWF arrays, and receiving tanks with draw-off pipes and valves. This combination of stored water with outlets for agricultural use and filtered water for community use for drinking, washing, and cooking can be tailored to suit a specific community, and specific geographic and climatic conditions.

While one particular form of the invention has been illustrated and described, it will be apparent that various modifications and combinations of the invention detailed in the text and drawings can be made without departing from the spirit and scope of the invention. For example, references to materials of construction, methods of construction, specific dimensions, shapes, utilities or applications are also not intended to be limiting in any manner and other materials and dimensions could be substituted and remain within the spirit and scope of the invention. Accordingly, it is not intended that the invention be limited, except as by the appended claims.

The invention claimed is:

1. A water harvesting sports arena system comprising:
   a stadium seating area,
   a multi-layer playing surface operating as at least a part of a water catchment arrangement, the playing surface including a porous thermoplastic polymer material top layer, a perforated tile bottom layer, and a layer of netting interposed between the top and bottom layers,
   a water reservoir positioned below the playing surface to receive and store water passing through the playing surface, the water reservoir having walls delimiting adjacent interconnected water reservoir segments between which water in the water reservoir is movable, and
   a water discharge arrangement by which water is dischargeable from the water reservoir for use,
   wherein the stadium seating area is impervious to water so as to direct water toward the playing surface,
   wherein the polymer material top layer performs coarse filtering of water passing through the playing surface, the layer of netting performs fine filtering of water passing through the playing surface, and the perforated tile bottom layer provides structural support to the playing surface, and
   wherein the water reservoir underlies the entire playing surface.

2. The water harvesting sports arena system according to claim 1, wherein the water discharge arrangement includes a water filtering system.

3. The water harvesting sports arena system according to claim 1, further comprising pumps arranged at locations along a perimeter of the water reservoir to draw unfiltered water from the reservoir.

4. The water harvesting sports arena system according to claim 3, wherein the water discharge arrangement includes a water filtering system.

5. The water harvesting sports arena system according to claim 1, wherein the reservoir is a segmented tank.

6. The water harvesting sports arena system according to claim 5, wherein the walls are shipping container walls.

7. A process of harvesting water comprising:
   providing a sports arena including a stadium seating area and a multi-layer playing surface, including a porous thermoplastic polymer material top layer, a perforated tile bottom layer, and a layer of netting interposed between the top and bottom layers, operating as at least a part of a water catchment arrangement,
   receiving and storing water passing through the playing surface in a water reservoir positioned below the playing surface,
   moving water in the water reservoir past walls disposed between adjacent interconnected water reservoir segments, and
   discharging the received and stored water from the water reservoir by way of a water discharge arrangement for use,
   wherein the stadium seating area is impervious to water so as to direct water toward the playing surface,
   wherein the polymer material top layer performs coarse filtering of water passing through the playing surface, the layer of netting performs fine filtering of water passing through the playing surface, and the perforated tile bottom layer provides structural support to the playing surface, and
   wherein the water reservoir underlies the entire playing surface.

8. The process according to claim 7, further comprising filtering water discharged by the water discharge arrangement by way of a water filtering system included in the water discharge arrangement.

9. The process according to claim 7, wherein pumps arranged at locations along a perimeter of the water reservoir draw off points for unfiltered water from the reservoir.

10. The process according to claim 9, further comprising filtering water discharged by the water discharge arrangement by way of a water filtering system included in the water discharge arrangement.

11. The process according to claim 7, wherein the reservoir is a segmented tank.

12. The process according to claim 11, wherein the walls are shipping container walls.

* * * * *